United States Patent
Miyanagi

(10) Patent No.: US 8,451,551 B2
(45) Date of Patent: May 28, 2013

(54) IMAGE READING APPARATUS AND IMAGE FORMING APPARATUS PROVIDED THEREWITH

(75) Inventor: Hideto Miyanagi, Osaka (JP)

(73) Assignee: Kyocera Document Solutions Inc. (JP)

( * ) Notice: Subject to any disclaimer, the term of this patent is extended or adjusted under 35 U.S.C. 154(b) by 254 days.

(21) Appl. No.: 13/072,935

(22) Filed: Mar. 28, 2011

(65) Prior Publication Data

US 2011/0242570 A1    Oct. 6, 2011

(30) Foreign Application Priority Data

Mar. 31, 2010 (JP) ................ P2010-080723

(51) Int. Cl.
*G02B 7/02* (2006.01)
*G03B 21/14* (2006.01)

(52) U.S. Cl.
USPC ....... 359/822; 353/101; 358/474; 235/462.25

(58) Field of Classification Search
USPC ......... 359/811, 813, 814, 822–824; 358/1.13, 358/474; 248/316.1; 348/362, E9.027; 353/100, 353/101, 119; 369/44.14–44.16, 44.25
See application file for complete search history.

(56) References Cited

U.S. PATENT DOCUMENTS

| | | | |
|---|---|---|---|
| 6,740,949 B2 * | 5/2004 | Andoh et al. | 257/432 |
| 7,152,982 B2 * | 12/2006 | Kitabayashi et al. | 353/119 |
| 7,224,494 B2 * | 5/2007 | Saitou et al. | 358/474 |
| 7,303,644 B2 * | 12/2007 | Kitabayashi et al. | 156/293 |
| 7,668,048 B2 * | 2/2010 | Nishidate et al. | 369/44.14 |

FOREIGN PATENT DOCUMENTS

| | | |
|---|---|---|
| JP | 5-273483 | 10/1993 |
| JP | 9-4145 | 1/1997 |
| JP | 9-298649 | 11/1997 |
| JP | 11-112742 | 4/1999 |
| JP | 2001-55543 | 2/2001 |
| JP | 2001-326789 | 11/2001 |
| JP | 2006-086984 | 3/2006 |
| JP | 2008-24738 | 2/2008 |

OTHER PUBLICATIONS

Office Action dated Jul. 31, 2012 issued in corresponding Japanese Patent Application No. 2010-080723 (not submitted herewith).
Office Action dated May 8, 2012 issued in corresponding Japanese Patent Application No. 2010-080723 (not submitted herewith).

* cited by examiner

*Primary Examiner* — Loha Ben
(74) *Attorney, Agent, or Firm* — Ostrolenk Faber LLP

(57) ABSTRACT

This image reading apparatus, includes: a first retaining member that retains a lens unit; a second retaining member that retains a sensor unit; and a positioning member that sets a relative position between the first retaining member and the second retaining member, wherein the positioning member comprises: a first concave portion that is sagged from a first contact surface to be in contact with the first retaining member; and a second concave portion that is sagged from a second contact surface to be in contact with the second retaining member, and the positioning member is fixed to the first retaining member and the second retaining member by an adhesive filled in the first concave portion and the second concave portion.

8 Claims, 4 Drawing Sheets

IMAGE READING APPARATUS AND IMAGE FORMING APPARATUS PROVIDED THEREWITH

BACKGROUND OF THE INVENTION

1. Field of the Invention

The present invention relates to an image reading apparatus and an image forming apparatus using the image reading apparatus.

Priority is claimed on Japanese Patent Application No. 2010-080723, filed Mar. 31, 2010, the contents of which are incorporated herein by reference.

2. Description of Related Art

An image forming apparatus in conventional such as copiers, printers, fax machines, or multifunction printers which are provided with a plurality of the functions of these apparatuses is provided with an image reading apparatus. The image reading apparatus is provided at an upper portion of the main unit of the image forming apparatus. The image reading apparatus is configured so as to irradiate light onto an image of an original document and read the original document image as image data, by receiving reflected light therefrom. In addition, the image reading apparatus includes: a light source unit that irradiates light onto an original document; and an image sensor that receives feedback light from the original document and converts it into image data, and the like.

Namely, the image reading apparatus includes: a light source that made of a lamp such as an LED or a xenon lamp for irradiating light onto a surface of an original document placed on a glass surface for an original document; a group of mirrors that sequentially reflect the light that has been reflected from the original document to guide it to an image forming lens (a condenser lens); and an image sensor such as a CCD (Charge Coupled Device) or a CMOS (Complementary Metal Oxide Semiconductor) that converts the light condensed by the image forming lens into electric signals.

The image forming lens and the image sensor such as a CCD of the image forming apparatus are mounted on a bottom surface of a chassis that is provided in the main unit of the image reading apparatus. When the image forming lens and the image sensor are mounted and fixed on the bottom surface of the chassis, a light acceptance portion of the image sensor is adjusted so as to be vertical to an optical axis of the image forming lens. In addition, the positions of the image forming lens and the image sensor are adjusted in the optical axis direction so that the focus and magnification are at the optimum. The image forming lens and the image sensor that the positions are adjusted in this manner are fixed with screws or by use of an adhesive.

Incidentally, in the aforementioned conventional image reading apparatus, fixation with an adhesive is more preferable than fixation with screws for the fixation of the image forming lens and the image sensor after their positional adjustment. Fixation with screws is likely to cause a displacement at the time of final tightening. Therefore, fixation with an adhesive is advantageously simpler.

However, in the case of fixation with an adhesive, the positions of the image forming lens and the image sensor are displaced due to a volume change (contraction) of the adhesive that occurs in the process in which the adhesive cures. This results in a disadvantage in that it is not possible to obtain a predetermined image quality.

SUMMARY OF THE INVENTION

The present invention adopts the following measures in order to solve the above-described problems and achieve the object of the present invention.

(1) An image reading apparatus according to one aspect of the present invention includes: a first retaining member that retains a lens unit; a second retaining member that retains a sensor unit; and a positioning member that sets a relative position between the first retaining member and the second retaining member, in which the positioning member comprises: a first concave portion that is sagged from a first contact surface to be in contact with the first retaining member; and a second concave portion that is sagged from a second contact surface to be in contact with the second retaining member, and in which the positioning member is fixed to the first retaining member and the second retaining member by an adhesive filled in the first concave portion and the second concave portion.

According to the image reading apparatus described in above (1), the first concave portion and the second concave portion in which the adhesive is to be filled are formed in the positioning member for setting the relative position between the first retaining member on which the lens unit is retained and the second retaining member on which the sensor unit is retained. As a result, even if there is a volume change in the adhesive that occurs in its curing process, namely, even if there is a contraction of the adhesive, it is possible to suppress a positional displacement of the positioning member because the contraction occurs only in the first concave portion and the second concave portion. This makes it possible to retain the first retaining member and the second retaining member in a proper positional relationship. Therefore, it is possible to prevent deterioration in image quality in advance.

DETAILED DESCRIPTION OF THE INVENTION

Figure 1:
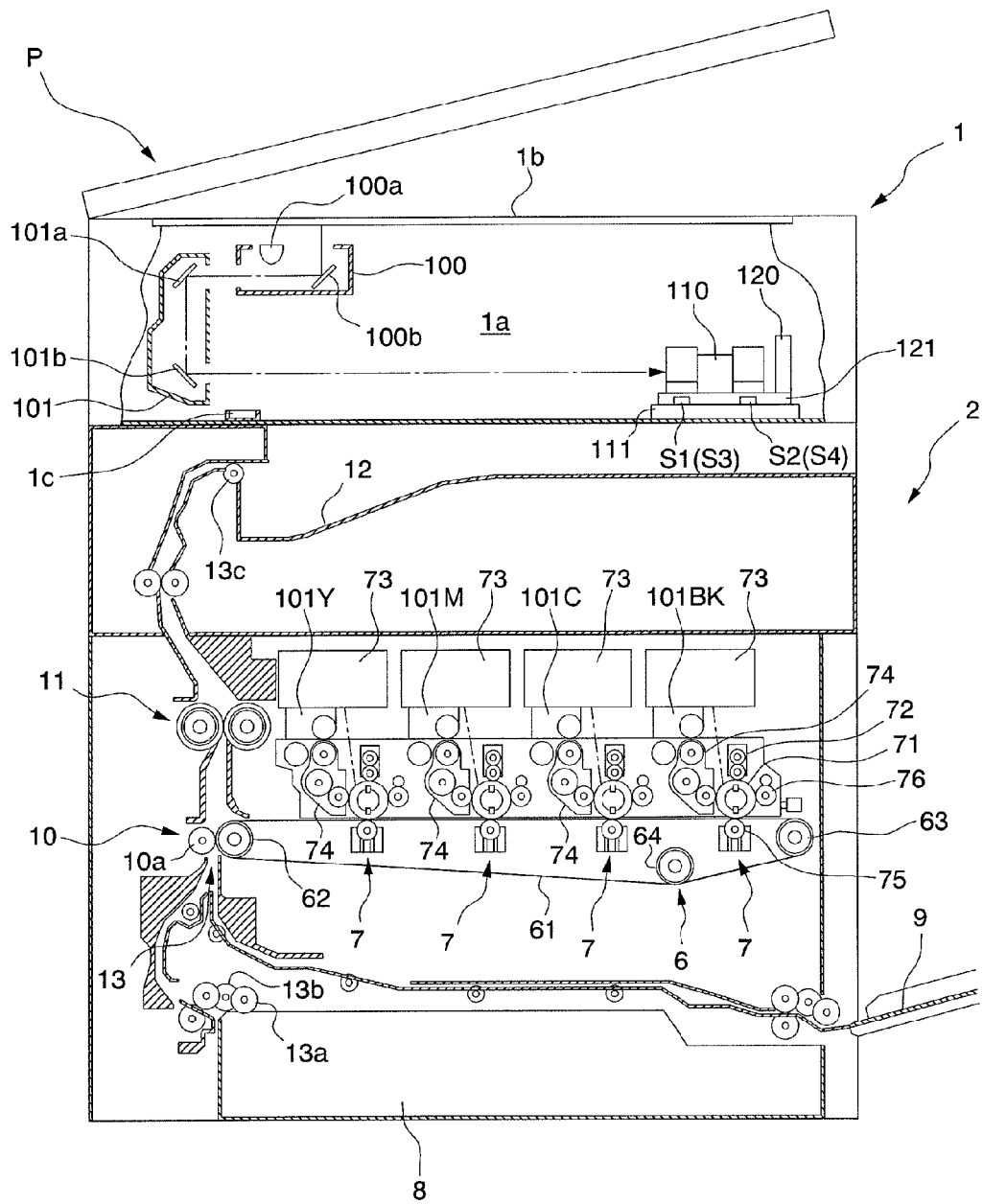
FIG. 1 is a cross-sectional view showing a schematic structure of a copier to which is applied an image reading apparatus according to an embodiment of the present invention.

The invention was made with respect to the above-described problems, and it is an object thereof to provide an image reading apparatus in which, when an adhesive is used to fix an image forming lens and an image sensor after their positional adjustment, positional displacements of the image forming lens and the image sensor are suppressed, and to provide an image forming apparatus provided with the same.

An embodiment of the image reading apparatus of the present invention will now be described with reference made to the drawings. In the drawings described below, the scale of each component has been suitably altered in order to make each component a recognizable size. In addition, in the following description, a copier is described as an example of the image forming apparatus of the present invention.

FIG. 1 is a cross-sectional view showing a schematic structure of a copier P to which the image reading apparatus of the present embodiment is applied. As shown in FIG. 1, the copier P of the present embodiment is provided with an image reading apparatus 1 that reads an image of an original document, and a printing unit 2 that prints onto recording paper (i.e., a recording medium) based on the read image data.

The printing unit 2 is provided with a belt unit 6, image formation units 7, a paper feed cassette 8, a paper feed tray 9, a secondary transfer unit 10, a fixing unit 11, a paper discharge tray 12, and a conveying path 13.

Toner images formed in the image formation units 7 are transferred onto the belt unit 6, and the belt unit 6 conveys these transferred toner images. The belt unit 6 is provided with an intermediate transfer belt 61 onto which toner images are transferred from the image formation units 7, a drive roller 62 that suspends the intermediate transfer belt 61 and also causes it to rotate endlessly, a driven roller 63, a tension roller 64.

The intermediate transfer belt 61 is suspended under tension by the drive roller 62, the driven roller 63, and the tension roller 64.

The drive roller 62 is connected to a drive unit having a drive source such as a motor or the like, and adds gripping force to the intermediate transfer belt 61. As a result, the intermediate transfer belt 61 rotates along the drive roller 62, the driven roller 63, and the tension roller 64.

The driven roller 63 is driven to rotate by receiving rotation drive from the drive roller 62.

The tension roller 64 is a type of driven roller that is driven to rotate by receiving the rotation drive from the drive roller 62, and has a spring mechanism that is used to add tension to the intermediate transfer belt 61.

In addition, the belt unit 6 is provided also with a cleaning unit (not shown), offering a structure that removes toner or the like remaining on the intermediate transfer belt 61.

The image formation units 7 are provided so as to correspond individually to the respective colors of yellow (Y), magenta (M), cyan (C), and black (BK), and form toner images in their respective colors. In addition, these image formation units 7 are arrayed along the intermediate transfer belt 61.

Each image formation unit 7 has a photoconductor 71, a charging unit 72, a laser scanning unit (light scanning apparatus) 73, a developing apparatus 74, a primary transfer roller 75, a cleaning apparatus 76, and a static charge eliminator (not shown) and the like.

The shape of the photoconductor 71 is set as a circular column, and electrostatic latent images and also toner images that are based on these electrostatic latent images are formed on the circumferential surface thereof. The charging unit 72 is positioned facing the photoconductor 71, and keeps the circumferential surface of the photoconductor 71 in a charged state. The laser scanning unit 73 scans laser light which is emitted based on print mode image data onto the circumferential surface of the charged photoconductor 71.

The developing apparatus 74 develops a toner image that is based on the electrostatic latent image on the circumferential surface of the photoconductor 71 by supplying a toner to the circumferential surface of the photoconductor 71. The primary transfer roller 75 is positioned facing the photoconductor 71 with the intermediate transfer belt 61 sandwiched between them, and performs the primary transfer of the toner images developed on the photoconductor 71 onto the intermediate transfer belt 61. The cleaning apparatus 76 removes remaining toner from the photoconductor 71 after the primary transfer.

The paper feed cassette 8 can be freely withdrawn from the apparatus main body and stores recording paper. The paper feed tray 9 can be freely opened and closed relative to the apparatus main body, and stores recording paper.

The secondary transfer unit 10 performs the secondary transfer of the images formed on the intermediate transfer belt 61 onto a recording medium, and is provide with the drive roller 62 which drives the intermediate transfer belt 61, and a secondary transfer roller 10a that is positioned facing the drive roller 62 with the intermediate transfer belt 61 sandwiched between them.

The fixing unit 11 fixes onto recording paper the toner image that has undergone the secondary transfer onto the recording medium, and is provided with a heating roller that fixes the toner image onto the recording paper by applying pressure and heat thereto.

The conveying path 13 is provided with a pickup roller 13a that picks up recording paper out from the paper feed cassette 8, a paper supply roller 13b that conveys the recording medium, and a paper discharge roller 13c that discharges the recording medium to the paper discharge tray 12.

In the copier P which has the above described structure, as is described above, image data is acquired in the image reading unit 1, and printing onto recording paper is performed in the printing unit 2 based on this image data.

Figure 2:
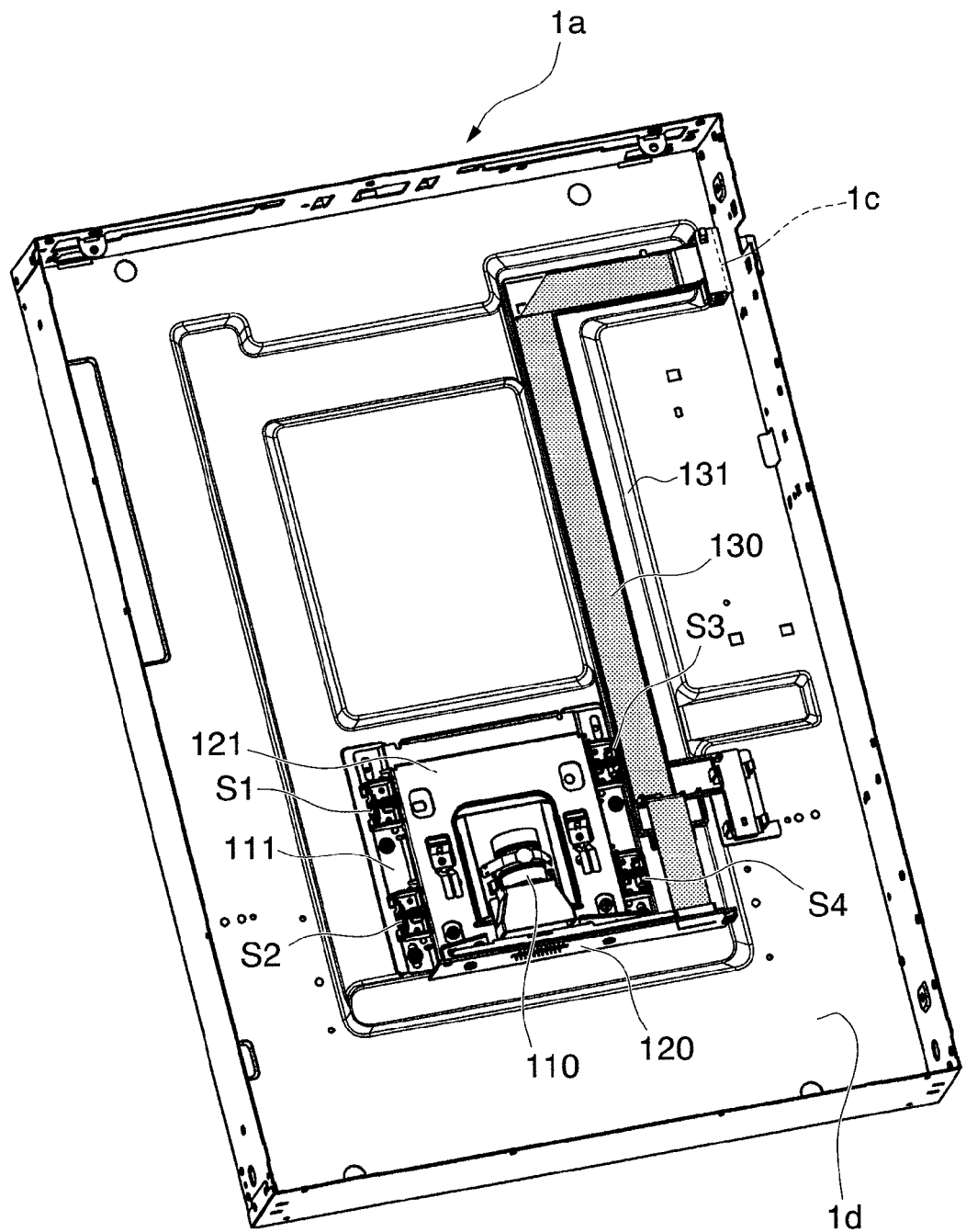
FIG. 2 is a perspective view showing a chassis of the image reading apparatus.

In the copier P of the present embodiment, the image reading apparatus 1 has a chassis 1a and an original document glass 1b (see FIG. 1) which covers an upper opening of the chassis 1a, as shown in FIG. 2. The chassis 1a is manufactured by processing on a metal plate, and has a shape of a box in which an upper portion of the chassis 1a is open. The chassis 1a is sometimes referred to as a bottom chassis. In the vicinity of a bottom surface at a part of one of the side walls of the chassis 1a (an upper portion on the right side wall in FIG. 2), a cable aperture 1c which is rectangular is opened.

The original document glass 1b is a transparent glass, and is provided so as to hermetically seal the upper opening of the chassis 1a. Therefore, since the upper portion of the chassis 1a is sealed up by the original document glass 1b, this construction prevents foreign matter such as dust from going through the upper opening into the chassis 1a. Note that the original document glass 1b has a strength capable of sufficiently withstanding a weight of the original document to be mounted thereon.

Reading equipment that is disposed in the chassis 1a will be described using FIG. 1 and FIG. 2. In the chassis 1a, a first carriage 100, a second carriage 101, a lens unit 110, a sensor unit 120, and a cable 130 are provided.

The first carriage 100 is provided so as to reciprocate in the horizontal direction (the left-right direction of the paper in FIG. 1) along a guide rail (not shown). The first carriage 100 is provided with a light source 100a and a mirror 100b.

The light source 100a is a lamp such as an LED or a xenon lamp for irradiating light onto an image of an original document mounted on the surface of the original document glass 1b. The mirror 100b reflects the reflected light to the original document to the second carriage 101 side.

The second carriage 101 is provided so as to reciprocate in the horizontal direction (the left-right direction in FIG. 1) along a guide rail (not shown). The second carriage 101 is provided with a first mirror 101a and a second mirror 101b. A light beam from the first carriage 100 is incident to the first mirror 101a and the second mirror 101b, the first mirror 101a and the second mirror 101b reflect the incident light beam to the lens unit 110.

The lens unit 110 is provided with an image forming lens (a condenser lens) on which the light beam emitted from the second carriage 101 is incident and condensed. The lens unit 110 is configured so that the light beam collected through the image forming lens can be irradiated onto the sensor unit 120.

Furthermore, as shown in FIG. 2, the image reading apparatus 1 is provided with a first retaining member 111 that retains the lens unit 110, with a second retaining member 121 that retains the sensor unit 120, and with positional setting members that sets a relative position between the first retaining member 111 and the second retaining member 121.

The first retaining member 111 is fixed on a bottom surface 1d of the chassis 1a, and is a plate member whose planar shape is substantially square. The above-mentioned lens unit 110 is fixedly provided on the first retaining member 111.

The second retaining member 121 is a plate member whose planar shape is substantially square, and is formed smaller than the first retaining member 111. The second retaining member 121 is provided on the first retaining member 111.

The sensor unit 120 includes an image sensor such as a CCD or a CMOS (hereinafter, described as "CCD sensor") element. In addition, the sensor unit 120 is configured so as to convert the light beam collected through the image forming lens of the lens unit 110 into electric signals. The sensor unit 120 is provided on the second retaining member 121.

Figure 4:
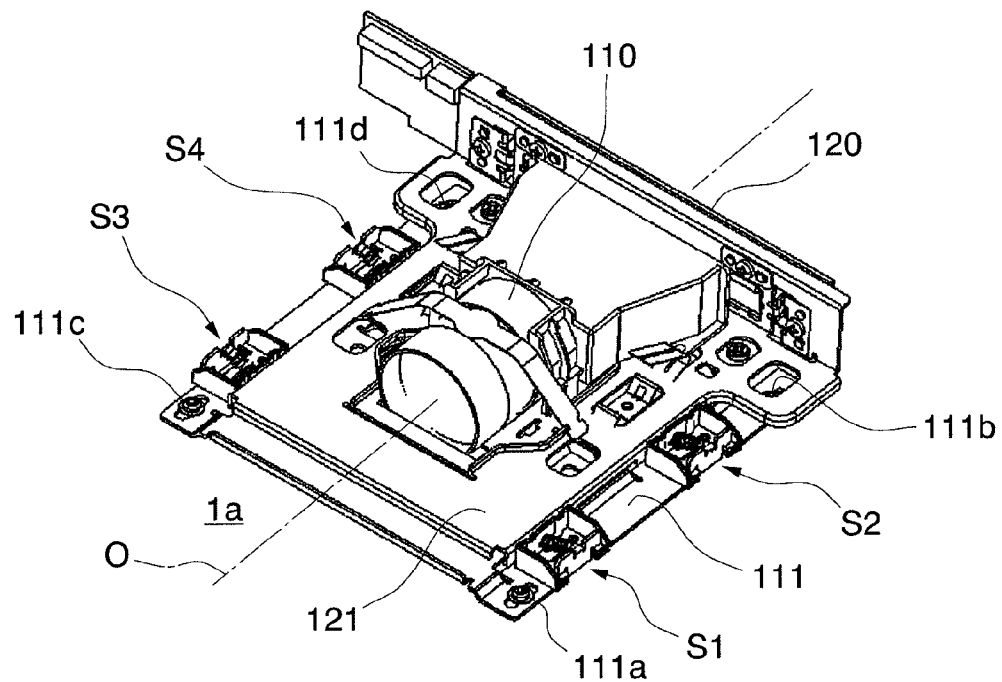
FIG. 4 is a perspective view including a lens unit of the image reading apparatus.

Furthermore, as shown in FIG. 4, the second retaining member 121 is fixed on the first retaining member 111 by four positioning members S1 to S4. The four positioning members S1 to S4 are arranged symmetrically with respect to an optical axis O of the lens unit. Specifically, they are arranged on both of the left and right sides centered the optical axis O of the lens unit 110, with a predetermined space therebetween along the direction of the optical axis O.

The cable 130 is provided with a flat cable in which a plurality of conductive wires is disposed with a predetermined space therebetween in a band-like electrical insulating material. Furthermore, in the chassis 1a, a trough 131 is provided which is fixed on the bottom surface 1d of the chassis 1a by adhesion or the like along the area from the sensor unit 120 to the cable aperture 1c. The cable 130, which is mounted and wired in the trough 131, extends to the outside of the chassis 1a through the cable aperture 1c, and is then connected to a control unit (a controller (CR)) provided in the main unit of the copier P. The control unit controls the overall operations of the copier P.

Figure 3:
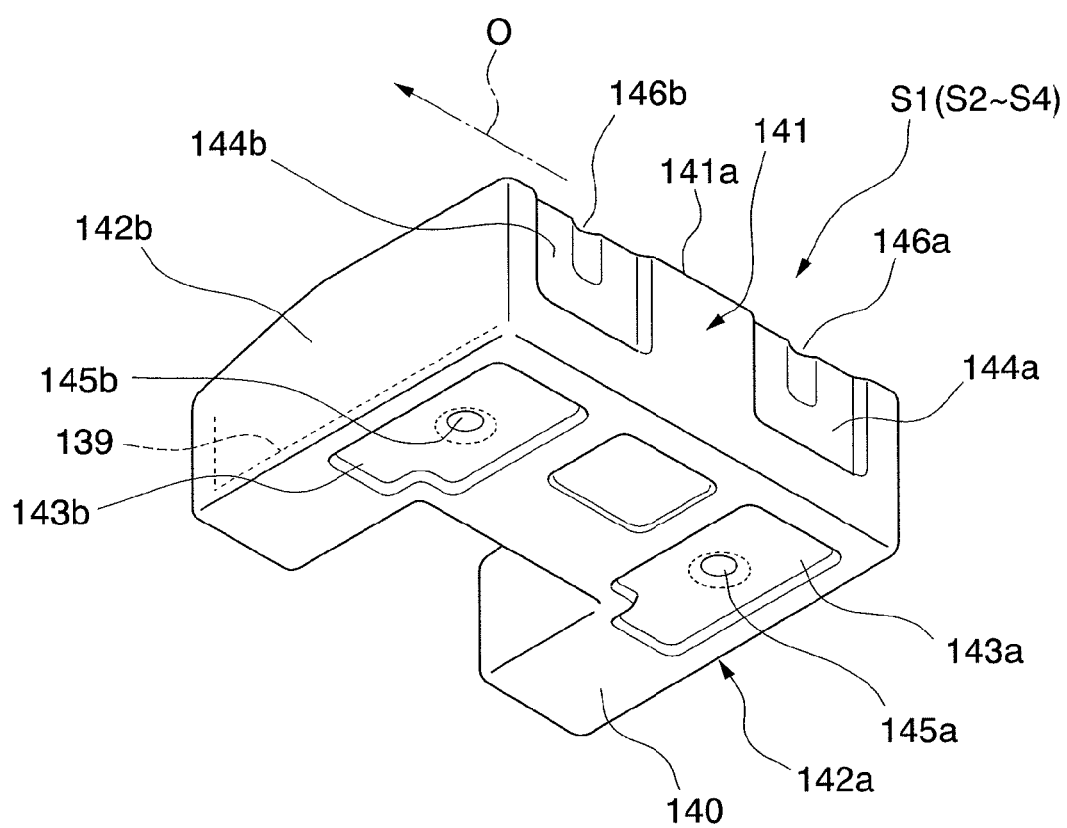
FIG. 3 is an enlarged perspective view showing a positioning member of the image reading apparatus.

Next, the positioning members S1 to S4 will be described using FIG. 3. The positioning members S1 to S4 are used after positional adjustment of the first retaining member 111 and the second retaining member 121. For easier understanding of the present embodiment, the first retaining member 111 and the second retaining member 121 will be firstly described using FIG. 4.

Portions near the ends of the first retaining member 111 on which the lens unit 110 is fixedly mounted are fixed on the bottom surface 1d of the chassis 1a by use of screws 111a to 111d. The ends of the first retaining member 111 are both of the left and right sides centered the optical axis O of the lens unit 110 (see a dashed line of FIG. 4). Namely, in each of the portions near the ends on the left and right sides of the first retaining member 111, an oval hole extending in the optical axis O direction is provided. Furthermore, the oval holes are formed so as to have allowance for the diameter of the screws 111a to 111d. Therefore, in a state with the screws 111a to 111d being loosened, the first retaining member 111 is moved in the optical axis O direction. Thereby, it is possible to easily adjust the position of the first retaining member 111. After the adjustment, the first retaining member 111 is fixed on the bottom surface 1d of the chassis 1a by tightening the screws 111a to 111d.

The second retaining member 121, on which the sensor unit 120 is fixedly mounted, is mounted on the first retaining member 111. The position of the second retaining member 121 is adjusted so that the focus and magnification of the lens unit 100 to the sensor unit 120 are at the optimum. After that, the second retaining member 121 is fixed on the first retaining member 111 by use of the four positioning members S1 to S4 (FIG. 3). The positioning members S1 to S4 are provided on the left and right sides centered the optical axis O, near the ends on the left and right sides along the optical axis O direction.

Namely, in the present embodiment, the positioning members S1 to S4 are arranged symmetrically with respect to the optical axis O of the lens unit 110. As a result, the acting forces from the positioning members S1 to S4 act uniformly with respects to the optical axis O, and it is possible to more reliably prevent the displacement of the optical axis O of the lens unit 110 with respect to the sensor unit 120. Note that the number and arrangement of the positioning members S1 to S4 are for illustrative purposes only. The number and arrangement of the positioning members S1 to S4 may be modified.

The positioning members S1 to S4 have the same structure. Therefore, the positioning member S1 will be described below, by way of example, with reference to FIG. 3.

The positioning member S1 is made from a material that transmits ultraviolet light. Namely, the positioning member S1 is a molded object made from a synthetic resin capable of transmitting ultraviolet light, and hence is transparent to ultraviolet light. This makes it possible to easily cure a light-curing adhesive, which will be described later.

The positioning member S1 has a first contact surface 140, a second contact surface 141, first dents for adhesive 143a, 143b (first concave portions), and second dents for adhesive 144a, 144b (second concave portions). In addition, the positioning member S1 has reinforcing pieces 142a, 142b, first inlet ports 145a, 145b (through-holes), and second inlet ports 146a, 146b (flow passages).

The first contact surface 140 has a flat surface with a planar shape of a letter C, which is to be in contact with the first retaining member 111. The second contact surface 141 is provided with an angle of 90 degrees with respect to a bottom surface 139 opposite to the first contact surface 140. In addition, the second contact surface 141 contacts with the second retaining member 121 and has a flat surface with a planar shape of a substantial rectangle. The reinforcing pieces 142a, 142b connect the end faces of the first contact surface 140 and the second contact surface 141.

The first dents for adhesive 143a, 143b are provided with a predetermined distance spaced from each other along the optical axis O direction of the first contact surface 140, and are a little sagged from the first contact surface 140. Namely, the first dents for adhesive 143a, 143b are sagged when seen from the side that is to be in contact with the first retaining member 111. Therefore, the first contact surface 140 other than the first dents for adhesive 143a, 143b is to be in contact with the first retaining member 111.

The second dents for adhesive 144a, 144b are provided with a predetermined distance spaced from each other along the optical axis O direction of the second contact surface 141, and are a little sagged from the second contact surface 141. Namely, the second dents for adhesive 144a, 144b are sagged when seen from the side that is to be in contact with the second retaining member 121. Therefore, the second contact surface 141 other than the second dents for adhesive 144a, 144b is to be in contact with the second retaining member 121.

The first inlet ports 145a, 145b are provided respectively at substantially the central portions of the first dents for adhesive 143a, 143b, and are formed by penetrating through the first contact surface 140 in the thickness direction of the positioning member S1. The first inlet ports 145a, 145b has a tapered shape whose inner diameter is smaller from the bottom surface 139 of the positioning member S1 toward the first contact surface 140. This shape makes large the contact area between the inside of the first inlet ports 145a, 145b and the adhesive.

Therefore, it is possible to fix the positioning member S1 to the first retaining member more firmly.

The second inlet ports 146*a*, 146*b* are formed by further denting the insides of the second dents for adhesive 144*a*, 144*b*. Specifically, the second inlet ports 146*a*, 146*b* extend from an end 141*a* of the second contact surface 141 (the end at which the second contact surface 141 is not in contact with the first contact surface 140) toward substantially central portions of the second dents for adhesive 144*a*, 144*b*. As a result, the ends of the second inlet ports 146*a*, 146*b* are exposed to the end 141*a* side of the second contact surface 141.

The first inlet ports 145*a*, 145*b* function as flow passages for introducing an adhesive to the first dents for adhesive 143*a*, 143*b*. Similarly, the second inlet ports 146*a*, 146*b* function as flow passages for introducing an adhesive to the second dents for adhesive 144*a*, 144*b*. With the first inlet ports 145*a*, 145*b* and the second inlet ports 146*a*, 146*b*, it is possible to easily introduce an adhesive to the first dents for adhesive 143*a*, 143*b* and the second dents for adhesive 144*a*, 144*b*.

Next, a method of fixing the second retaining member 121 onto the first retaining member 111 by use of the positioning members S1 to S4 with the above structure will be described.

Figure 5:
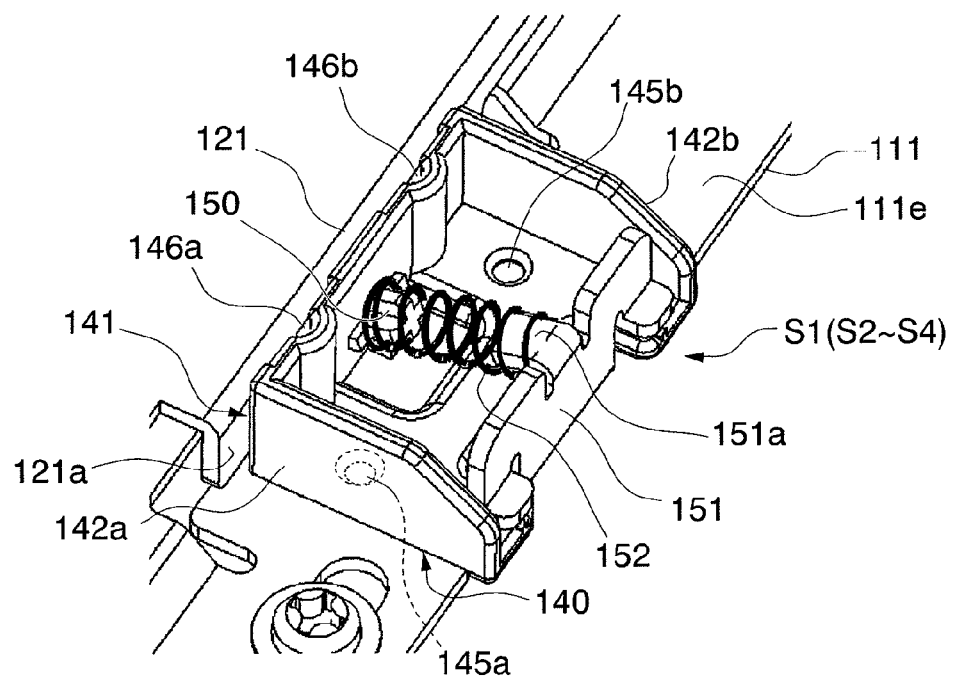
FIG. 5 is a perspective view showing how the positioning member of the image reading apparatus is attached.

The second retaining member 121 on which the sensor unit 120 is fixedly mounted is mounted onto the first retaining member 111, and the positions of the first retaining member 111 and the second retaining member are adjusted so that the focus and magnification of the lens unit 100 to the sensor unit 120 are optimal. After that, as shown in FIG. 4 and FIG. 5, the four positioning members S1 to S4 are arranged in contact with the first retaining member 111 and the second retaining member 121. Namely, in each of the positioning members S1 to S4, the first contact surface 140 is in contact with the upper surface of the first retaining member 111, and also the second contact surface 141 is in contact with the end face of the second retaining member 121.

Subsequently, a light-curing adhesive is injected into the first inlet ports 145*a*, 145*b* at the bottom surface 139 (the surface opposite to the first contact surface 140) of each of the positioning members S1 to S4. The light-curing adhesive is injected into the second inlet ports 146*a*, 146*b* at the end 141*a* of the second contact surface 141. The injected light-curing adhesive spreads from the first inlet ports 145*a*, 145*b* to the first dents for adhesive 143*a*, 143*b* and fills them, and moreover, spreads from the second inlet ports 146*a*, 146*b* to the second dents for adhesive 144*a*, 144*b* and fills them. After that, light (ultraviolet light) is irradiated onto the positioning members S1 to S4. This cures the light-curing adhesive filled in the first dents for adhesive 143*a*, 143*b* and the second dents for adhesive 144*a*, 144*b*. Thus, the first retaining member 111 and the second retaining member 121 are strongly bonded to each other via the positioning members S1 to S4.

When the light-curing adhesive cures, its volume changes (contracts). However, the change occurs only in the first dents for adhesive 143*a*, 143*b* and the second dents for adhesive 144*a*, 144*b*. As a result, this has no influence on the bonding position of the contact surface between the first contact surface 140 and the first retaining member 111, and on the bonding position of the contact surface between the second contact surface 141 and the second retaining member 121. Therefore, it is possible to suppress the positional displacement between the first retaining member 111 and second retaining member 121 that have been positioned.

Furthermore, as shown in FIG. 5, the copier P of the present embodiment has a protrusion 150, a retaining piece 151 that is standed from the first retaining member 111, and a biasing member 152, in each of the positioning members S1 to S4.

The protrusion 150 is protrudingly provided at the central portion of the surface 141*a* on the other side of the second contact surface 141.

The retaining piece 151 is erected on an area, of the first retaining member 111 on which the positioning member S1 is to be mounted, that does not interfere the mounting of the positioning member S1. In addition, the retaining piece 151 is provided with a folded piece 151*a* that is folded so as to little protrude toward the protrusion 150 side.

The biasing member 152 is a coil spring provided between the protrusion 150 and the folded piece 151*a* of the retaining piece 151. The biasing member 152 always biases the second contact surface 141 toward the second retaining member 121.

As for the relative position between the protrusion 150 and the folded piece 151*a*, the protrusion 150 is lower than the folded piece 151*a*, as shown in FIG. 5. Therefore, when the second contact surface 141 is pressed by the biasing member 152, the second contact surface 141 is allowed to be in tight contact with an end face 121*a* of the second retaining member 121, and also the first contact surface 140 is allowed to be in tight contact with an upper surface 111*e* of the first retaining member 111.

Namely, in the present embodiment, the biasing member 152 is attached in the direction diagonal to both of the two contact surfaces whose installation angles are different from each other (the first contact surface 140 and the second contact surface 141). As a result, the biasing member 152 always biases the first contact surface 140 toward the first retaining member 111, too. Therefore, the single biasing member 152 is configured to be capable of pressing the two contact surfaces against the retaining members (the first retaining member 111 and the second retaining member 121).

Thus, by the biasing member 152, the second contact surface 141 is biased toward the second retaining member 121, and the first contact surface 140 is biased toward the first retaining member 111. As a result, after the positional adjustment of the first retaining member 111 and the second retaining member 121, the positioning members S1 to S4 can be retained until the light-curing adhesive cures, without supporting the positioning members S1 to S4 by use of special attachment jigs. Furthermore, the positioning members S1 to S4 can be set on the upper surface 111*e* of the first retaining member 111 in advance. Therefore, it is possible to make the assembly work efficient.

In the copier P with the above structure, the positioning members S1 to S4 are each provided with the first dents for adhesive 143*a*, 143*b* and the second dents for adhesive 144*a*, 144*b*. Thereby, even if the volume of the filled light-curing adhesive changes when it cures, the change occurs only in the first dents for adhesive 143*a*, 143*b* and the second dents for adhesive 144*a*, 144*b*. This has no influence on the bonding position of the contact surface between the first contact surface 140 and the first retaining member 111, and on the bonding position of the contact surface between the second contact surface 141 and the second retaining member 121. Therefore, there is no change in relative position between the first retaining member 111 and second retaining member 121 that have been positioned, and hence, it is possible to prevent a decrease in image quality in advance.

A preferred embodiment of the present invention has been described above with reference made to the attached drawings. However, it is to be understood that the present invention is not limited solely to the above-described embodiment. The various configurations and combinations and the like of the respective component elements illustrated in the above-described embodiment are just one example thereof, and various modifications are possible based on design requirements and the like insofar as they do not depart from the spirit or scope of the present invention.

For example, in the above-described embodiment, the illustrated example has been for the image reading apparatus that is applied to a copier. However, the prevent invention may be applied to an image forming apparatus of other equipment.

In the above-mentioned embodiment, the light-curing adhesive is injected into the first dents for adhesive 143a, 143b and the second dents for adhesive 144a, 144b respectively via the first inlet ports 145a, 145b and the second inlet ports 146a, 146b. However, the light-curing adhesive may be filled in the first dents for adhesive 143a, 143b and the second dents for adhesive 144a, 144b in advance, and the first inlet ports 145a, 145b and the second inlet ports 146a, 146b may be omitted. Furthermore, the positioning members S1 to S4 are provided pairwise on both sides of the optical axis. However, a single positioning member may be provided on both sides of the optical axis. Alternatively, a single positioning member may be provided on one side, and two positioning members may be provided on the other side.

The planar shape of the first contact surface 140 has been described as C shape, but it may have a rectangular shape. The reinforcing pieces 142a, 142b are necessarily being provided. Furthermore, the through-holes 145a, 145b have been described as having a taper shape, but they may be a cylindrical hole.

What is claimed is:

1. An image reading apparatus, comprising:
    a first retaining member that retains a lens unit;
    a second retaining member that retains a sensor unit; and
    a positioning member that sets a relative position between the first retaining member and the second retaining member, wherein
    the positioning member comprises: a first concave portion that is sagged from a first contact surface to be in contact with the first retaining member; and a second concave portion that is sagged from a second contact surface to be in contact with the second retaining member, and
    the positioning member is fixed to the first retaining member and the second retaining member by an adhesive filled in the first concave portion and the second concave portion.

2. The image reading apparatus according to claim 1, wherein
    a through-hole that penetrates in a thickness direction of the positioning member is formed in the first concave portion, and
    a flow passage, one end of which is exposed from an end of the second contact surface, is formed in the second concave portion.

3. The image reading apparatus according to claim 1, wherein
    a through-hole is formed in a thickness direction of the positioning member, and
    an inner diameter of the through-hole is larger from the first contact surface side toward a surface opposite to the first contact surface.

4. The image reading apparatus according to claim 1, further comprising
    a biasing member that biases the first contact surface to the first retaining member, and biases the second contact surface to the second retaining member.

5. The image reading apparatus according to claim 4, wherein
    the first contact surface and the second contact surface are provided with an angle therebetween, and
    the biasing member is attached obliquely to both of the first contact surface and the second contact surface.

6. The image reading apparatus according to claim 1, wherein
    the positioning member is formed of a material that transmits ultraviolet light.

7. The image reading apparatus according to claim 1, comprising a plurality of the positioning members, wherein
    the positioning members are arranged symmetrically with respect to an optical axis of the image forming lens.

8. An image forming apparatus that forms an image on a recoding medium based on an image data read out by an image reading apparatus, wherein
    the image reading apparatus is the image reading apparatus according to claim 1.

* * * * *